(12) United States Patent
Sakai et al.

(10) Patent No.: US 6,863,298 B2
(45) Date of Patent: Mar. 8, 2005

(54) OCCUPANT PROTECTING DEVICE (75) Inventors: Katsuyuki Sakai, Shiga (JP); Kazuhiro Abe, Shiga (JP)

(73) Assignee: Takata Corporation, Tokyo (JP)

( * ) Notice: Subject to any disclaimer, the term of this patent is extended or adjusted under 35 U.S.C. 154(b) by 70 days.

(21) Appl. No.: 10/458,293

(22) Filed: Jun. 11, 2003

(65) Prior Publication Data

US 2003/0230872 A1 Dec. 18, 2003

(30) Foreign Application Priority Data

Jun. 12, 2002 (JP) .................................. 2002-171687

(51) Int. Cl.⁷ .............................................. B60R 21/16
(52) U.S. Cl. .................. 280/728.1; 280/742; 297/216.1
(58) Field of Search ............................. 280/728.1, 740, 280/741, 742, 806; 297/216.1

(56) References Cited

U.S. PATENT DOCUMENTS

| | | | |
|---|---|---|---|
| 3,853,334 A | | 12/1974 | Auman et al. |
| 5,082,326 A | * | 1/1992 | Sekido et al. ............ 297/284.6 |
| 5,340,185 A | | 8/1994 | Vollmer |
| 5,695,242 A | * | 12/1997 | Brantman et al. ....... 297/216.1 |
| 5,902,010 A | * | 5/1999 | Cuevas .................. 297/216.13 |
| 5,947,514 A | * | 9/1999 | Keller et al. ................ 280/742 |
| 6,050,635 A | * | 4/2000 | Pajon et al. ............. 297/216.1 |
| 6,276,714 B1 | | 8/2001 | Yoshioka |
| 6,293,626 B1 | | 9/2001 | Nariyasu |
| 6,419,264 B1 | | 7/2002 | Tsuji et al. |

2001/0011810 A1  8/2001  Saiguchi et al.

FOREIGN PATENT DOCUMENTS

| | | |
|---|---|---|
| EP | 0 963 880 A1 | 12/1999 |
| GB | 2 284 393 A | 6/1995 |
| GB | 2 332 884 A | 7/1999 |
| GB | 2 347 902 A | 9/2000 |
| JP | 60-240535 A | 11/1985 |
| JP | 01-275230 A | 11/1989 |
| JP | 07-081466 A | 3/1995 |
| JP | 10-217818 A | 8/1998 |
| JP | 10-309967 A | 11/1998 |
| JP | 11-334523 A | 12/1999 |
| JP | 11-348721 A | 12/1999 |
| JP | 2000-255358 A | 9/2000 |
| JP | 2001-239872 A | 9/2001 |
| JP | 2001-247010 A | 9/2001 |
| WO | WO 98/41426 A1 | 9/1998 |
| WO | WO 99/30922 A1 | 6/1999 |
| WO | WO 01/45978 A1 | 6/2001 |

* cited by examiner

*Primary Examiner*—Paul N. Dickson
*Assistant Examiner*—Toan To
(74) *Attorney, Agent, or Firm*—Foley & Lardner LLP (57) ABSTRACT

An occupant protecting device which makes it possible to inflate a bag of an inflatable seatbelt device or exerting a pre-tension upon a seatbelt by a gas generator for inflating a bag disposed at the front portion of a seat cushion. An occupant protecting device including an inflatable tube disposed under the front portion of a cushion pad. Gas from an inflator enters the tube through a cylinder. A piston is disposed inside the cylinder, and is connected to a lap anchor through a wire. A structure which causes a bag to be inflated by the gas from the inflator may also be used.

17 Claims, 7 Drawing Sheets

OCCUPANT PROTECTING DEVICE

BACKGROUND OF THE INVENTION

The present invention relates to an occupant protecting device for protecting an occupant in a seat of a vehicle, such as an automobile, at the time of a collision. More particularly, the invention relates to an occupant protecting device for preventing forward movement of the body of the occupant when the vehicle is involved in a frontal collision.

In order to prevent a submarine phenomenon in which an occupant wearing a seatbelt moves through a space below a lap belt when a vehicle collides from its front side, a device for raising the front portion of a seat cushion when the vehicle collides has been proposed as a system for protecting the occupant of an automobile. For example, Japanese Unexamined Patent Application Publication No. 10-309967 (incorporated by reference herein) discloses a vehicle seat having a seat cushion whose front end portion is pushed up by an explosive actuator, and Japanese Unexamined Patent Application Publication No. 10-217818 (incorporated by reference herein) discloses a vehicle seat having a seat cushion whose front end portion is pushed up by an airbag.

Japanese Unexamined Patent Application Publication No. 2001-247010 (incorporated by reference herein), discloses an occupant protecting device comprising an elongated bag and a pretensioner. The bag becomes shorter when it is inflated, and is disposed below the front portion of a seat cushion of a seat comprising the seat cushion and a seat back. The pretensioner pulls down a seatbelt buckle when the bag is inflated and shortened.

Inflatable seatbelt devices are publicly known as occupant protecting devices.

Japanese Unexamined Patent Application Publication Nos. 11-334523, 11-348721, and 2000-255358 (both incorporated by reference herein) disclose exemplary devices. The inflatable seatbelt devices comprise a bag that is, like an ordinary seatbelt, provided along the front surface of the body of an occupant, and is inflated by a gas generator at the time of a collision.

SUMMARY OF THE INVENTION

According to an embodiment of the present invention an occupant protecting device that uses gas pressure of a gas generator for inflating a bag disposed at the front portion of a seat back and an occupant restraining mechanism for restraining the forward movement of an occupant in the event of a vehicle collision. The occupant restraining mechanism may include a pretensioner cylinder mechanism or an inflatable seatbelt device.

According to one aspect of the present invention, there is provided an occupant protecting device comprising a seat having a seat cushion and a seat back; an inflatable bag disposed inside or under the front portion of the seat cushion; a gas generator for inflating the bag in an emergency in a vehicle; and a pretensioner for applying tension to a seatbelt in conjunction with the operation of the gas generator. The pretensioner comprises a cylinder mechanism for moving a piston by gas pressure from the gas generator.

In the occupant protecting device having such a structure, the bag expands due to the operation of the gas generator in an emergency, such as a collision of the vehicle, and the front portion of the seat cushion is pushed upward or a portion of the seat cushion contacting the bag is pushed from therebelow and compressed and hardened in order to prevent the submarine phenomenon of the occupant, so that restraining capability with respect to the occupant is improved.

When the gas generator operates, gas enters the pretensioner cylinder mechanism thereby causing the piston to move and generating tension in the seatbelt. As a result, the seatbelt is pulled so as to come into close contact with the body of the occupant, thereby firmly restraining the occupant.

In the occupant crash protector of according to an embodiment of the present invention, since a common operation power source is used for a bag inflator for the front portion of the seat cushion and the seatbelt pretensioner, structural costs of the occupant crash protector can be reduced.

By either pushing up or hardening the front portion of the cushion and by generating tension in a lap belt by the pretensioner, the occupant can be firmly restrained at his seat from his thighs to his waist.

According to another aspect of the present invention, there is provided an occupant protecting device comprising a seat having a seat cushion and a seat back; an inflatable bag disposed inside or under the front portion of the seat cushion; a gas generator for inflating the bag in an emergency in a vehicle; a bag of an inflatable seatbelt device, the bag being inflated along the front side of the body of the occupant when the vehicle collides; and a gas guide for inflating the bag of the seatbelt device by causing gas introduced into the bag from the gas generator.

In this occupant protecting device also, by the expansion of the inflatable bag by the operation of the gas generator in an emergency, such as a collision of the vehicle, the front portion of the seat cushion is pushed upward or a portion of the seat cushion contacting the bag is pushed from therebelow and compressed and hardened in order to prevent the submarine phenomenon of the occupant, so that restraining capability with respect to the occupant is improved.

From the gas generator, a portion of the gas enters the bag of the inflatable seatbelt device too. This causes the bag to be inflated, thereby restraining the front surface of the body of the occupant.

In the occupant protecting device of an embodiment of the present invention, since a common gas-generating source is used for a bag inflator for the front portion of the seat cushion and a gas generator for the inflatable seatbelt device, structural costs of the occupant crash protector can be reduced.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 4(*a*) illustrates the structure of a seat frame assembly including an occupant protecting device according to a second embodiment of the present invention.

FIG. 4(*b*) is an enlarged view of a portion of the seat frame assembly shown in FIG. 4(*a*).

FIGS. 5(*a*) and 5(*b*) each illustrate the structure of a cylinder mechanism according to the embodiment of the present invention shown in FIG. 4(*a*).

FIGS. 6(*a*) and 6(*b*) each illustrate the structure of a seat frame assembly including an occupant protecting device according to a third embodiment of the present invention.

FIGS. 7(*a*) and 7(*b*) are each enlarged views of a portion of the occupant protecting device shown in FIGS. 6(*a*) and 6(*b*).

DETAILED DESCRIPTION

Figure 1A:
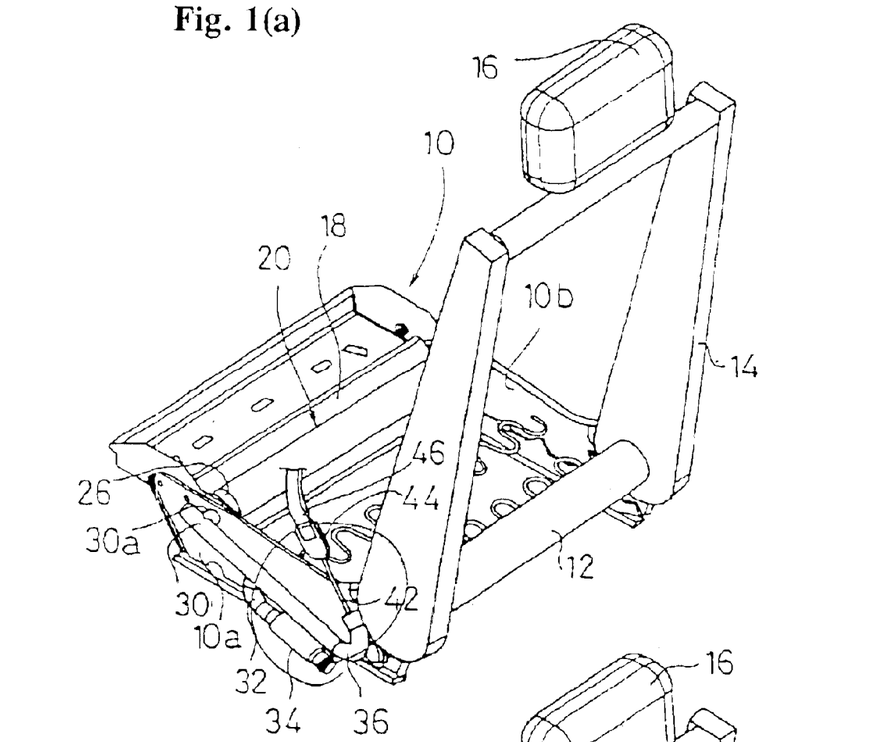
FIGS. 1(a) and 1(b) show a perspective view of a seat frame assembly including an occupant protecting device according to a first embodiment of the present invention.
Figure 1B:
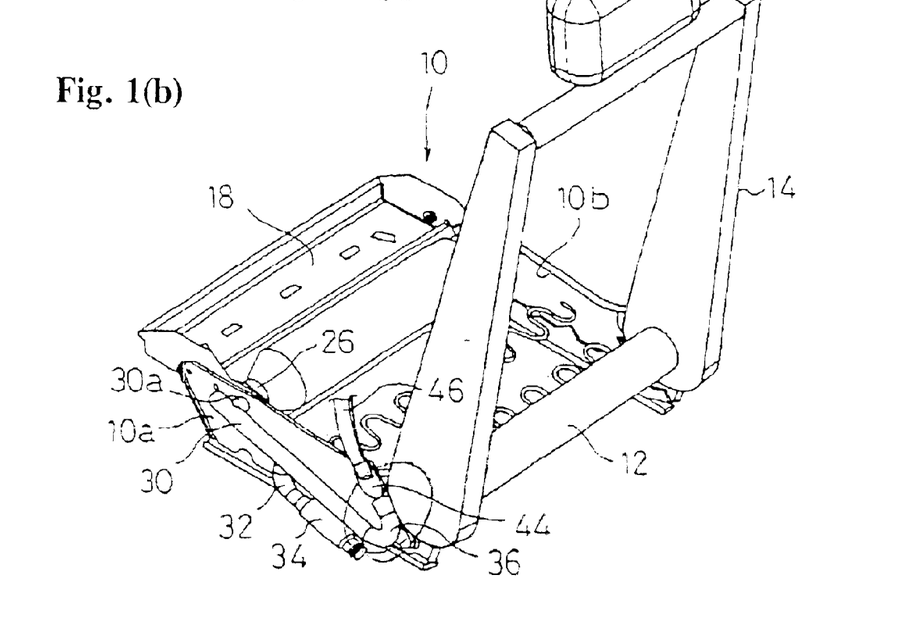
Figure 2A:
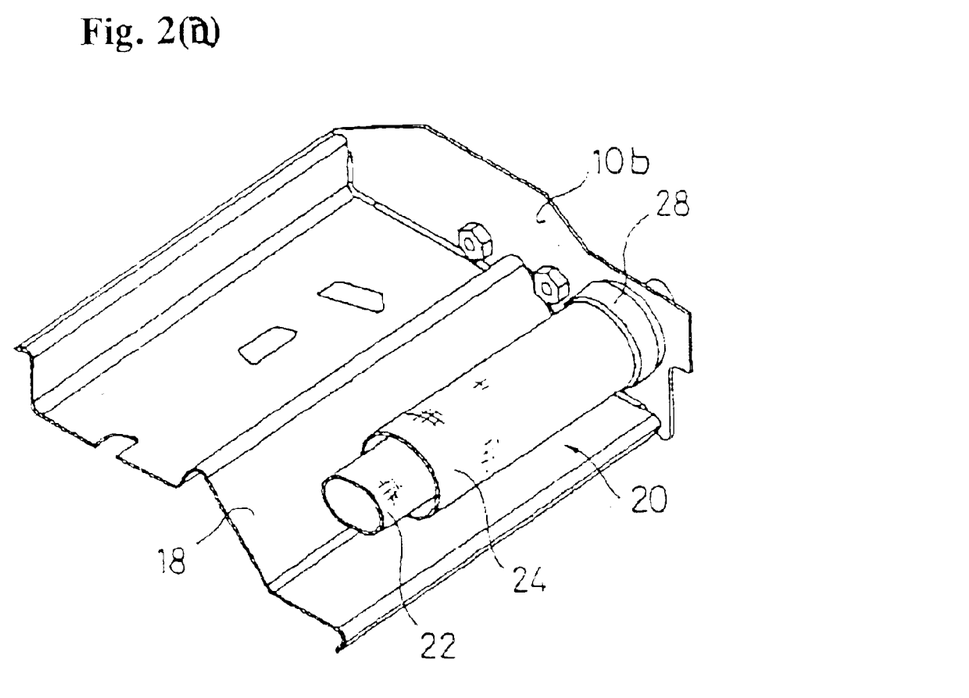
FIGS. 2(a) and 2(b) are enlarged views of a portion of the frame assembly shown in FIGS. 1(a) and 1(b).
Figure 2B:
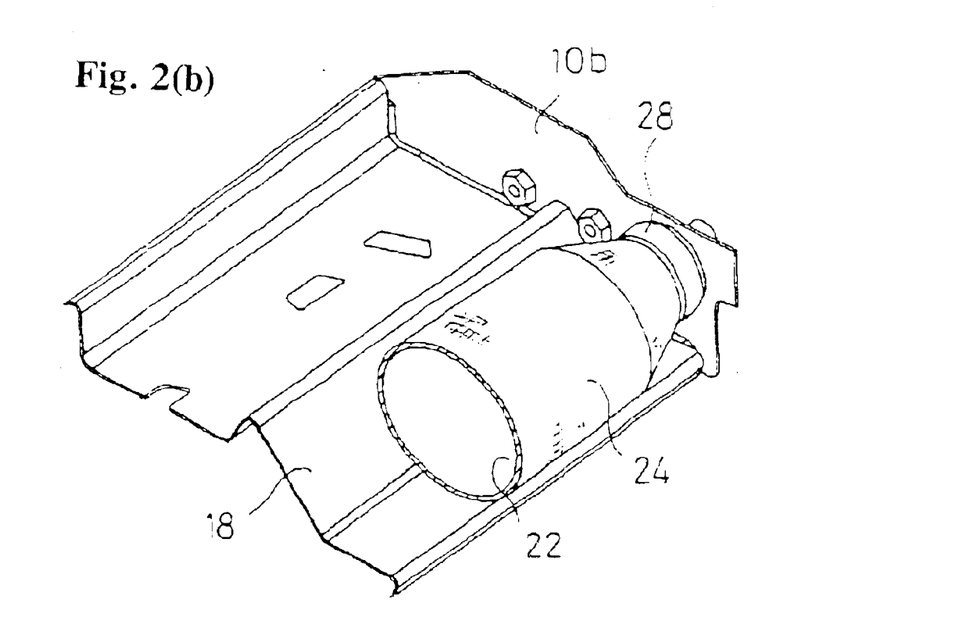
Figure 3A:
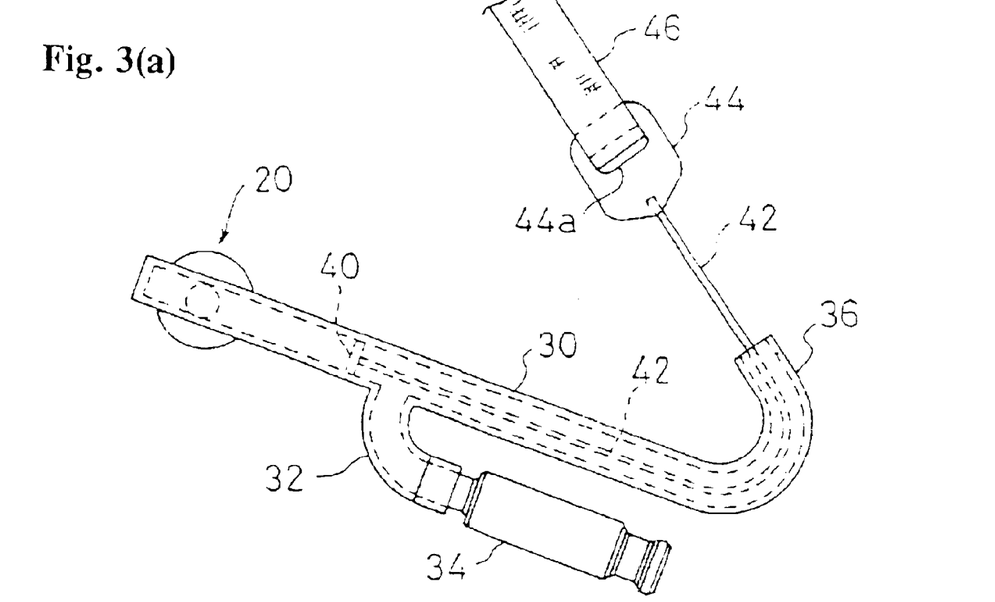
FIGS. 3(a) and 3(b) each illustrate the structure of a cylinder mechanism according to an embodiment of the present invention.
Figure 3B:
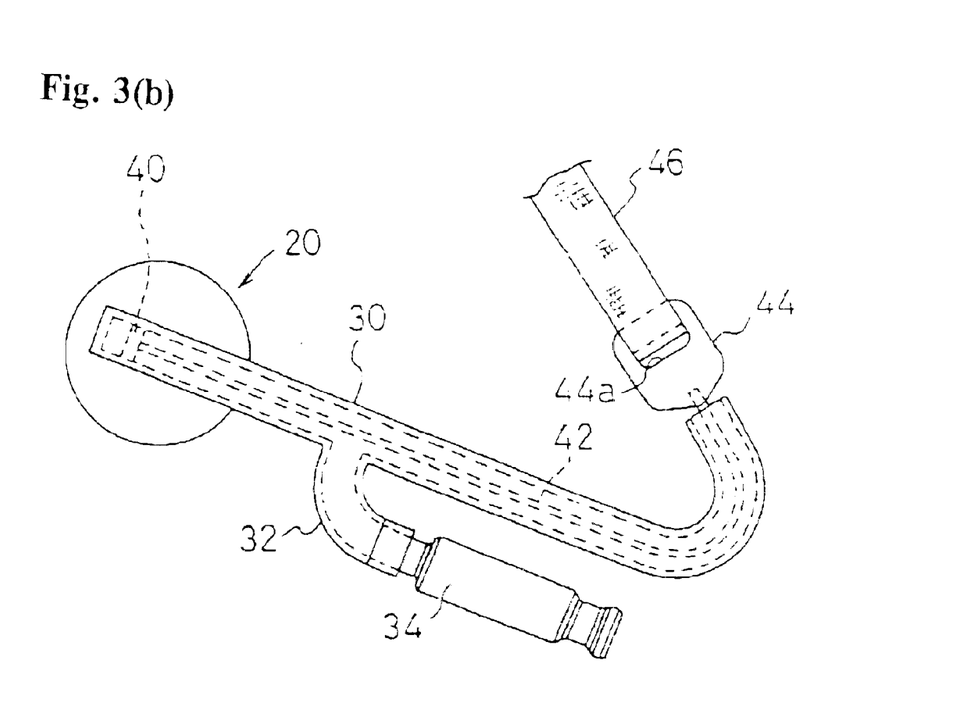

Hereunder, a description of preferred embodiments of the present invention will be given with reference to the drawings. FIGS. 1(*a*) and 1(*b*) are each perspective views of a seat frame assembly including an occupant protecting device of an embodiment of the present invention. FIGS. 2(*a*) and 2(*b*) are each enlarged views of a portion of the frame assembly shown in FIGS. 1(*a*) and 1(*b*). FIGS. 3(*a*) and 3(*b*) each illustrate the structure of a cylinder mechanism. FIGS. 1(*a*), 2(*a*), and 3(*a*) each show a state prior to operation of an inflator. FIGS. 1(*b*), 2(*b*), and 3(*b*) each show a state after the operation of the inflator.

The frame assembly of a seat of an automobile comprises a base frame 10 and a back frame 14 rotatably connected to the base frame 10 through a support shaft 12 and a reclining device (not shown). A head rest 16 is mounted to the top portion of the back frame 14. The base frame 10 includes, for example, a left side frame portion 10*a*, a right side frame portion 10*b*, and a seat pan 18, disposed between the front portions of the side frame portions 10*a* and 10*b*.

At the top side of the seat pan 18, an inflatable tube 20 is disposed between the side frame portions 10*a* and 10*b*. The tube 20 includes a cylindrical bag 22 and a cylindrical mesh webbing 24 surrounding the bag 22. The bag 22 is a foldable, elongated member. The mesh webbing 24 is stretchable in radial directions, but is a knitted fabric that does not substantially stretch in the longitudinal directions (towards the left and right of the seat).

One end of the tube 20 is connected to the side frame portion 10*a* by a mounting attachment 26, while the other end of the tube 20 is connected to the side frame portion 10*b* by a mounting attachment 28.

A conduit is provided including a cylinder 30, a curved tube 36 and a connecting tube 32. The cylinder 30 is disposed along the outer side of the side frame portion 10*a*. An inflator or gas generator 34 is mounted to the cylinder 30 through the connecting tube 32. A portion near an end of the cylinder 30 connects to the inside of the tube 20 through a connector 30*a*. The cylinder 30 extends up to a point situated forwardly of the connector 30*a*. The curved substantially U-shaped tube 36 is connected to the back end of the cylinder 30.

A piston 40 is disposed forwardly of the connecting tube 32 inside the cylinder 30. One end of a wire 42 is connected to the piston 40. The wire 42 extends rearwardly inside the cylinder 30 and upwardly through the curved tube 36. The other end (top end) of the wire 42 is connected to a lap anchor 44. A seatbelt (lap belt) 46 is connected to an opening 44*a* of the lap anchor 44. A gas sealer is provided inside the curved tube 36. The wire 42 passes through a hole (not shown) of the gas sealer. A sealer is also disposed between the inner periphery of the hole and the wire 42.

Although not shown, a cushion pad and a back pad, formed of urethane or the like, are mounted to the base frame 10 and the back frame 14, respectively. The tube 20 is disposed below the cushion pad.

Next, the operation of the occupant crash protector will be described. When a collision of an automobile from its front side is detected, the inflator 34 ejects gas into the cylinder 30. As a result, as shown in FIGS. 1(*b*) and 3(*b*), the piston 40 moves forward and pulls the wire 42, causing the lap anchor 44 to be pulled downward. This causes the pretensioner to be activated as a pre-tension is exerted upon the seatbelt 46, so that the seatbelt 46 comes into close contact with the occupant.

When the piston 40 reaches the front end of the cylinder 30, as shown in FIG. 3(*b*), the piston 40 is positioned forwardly of the connector 30*a*. As a result, the gas inside the cylinder 30 flows into the tube 20 through the connector 30*a*, causing the tube 20 to be inflated. As a result, the front portion of the cushion pad of a seat cushion is either pushed upward or hardened, thereby preventing forward movement of the waist of the occupant.

Since a pre-tension is exerted upon the lap belt 46 to push down the waist, the occupant is sandwiched by both the lap belt 46 and the raised or hardened front portion of the cushion pad, so that the occupant can be firmly restrained at his seat from his thighs to his waist.

In this way, according to the embodiment of the present invention, the tube 20 and the pretensioner cylinder mechanism are inflated and driven, respectively, by the common inflator 34, so that the mechanism can simplified. In addition, by the cylinder mechanism, the lap anchor 44 is pulled downward by a predetermined height at an early stage, so that a pre-tension can be exerted at an early stage.

Figure 4A:
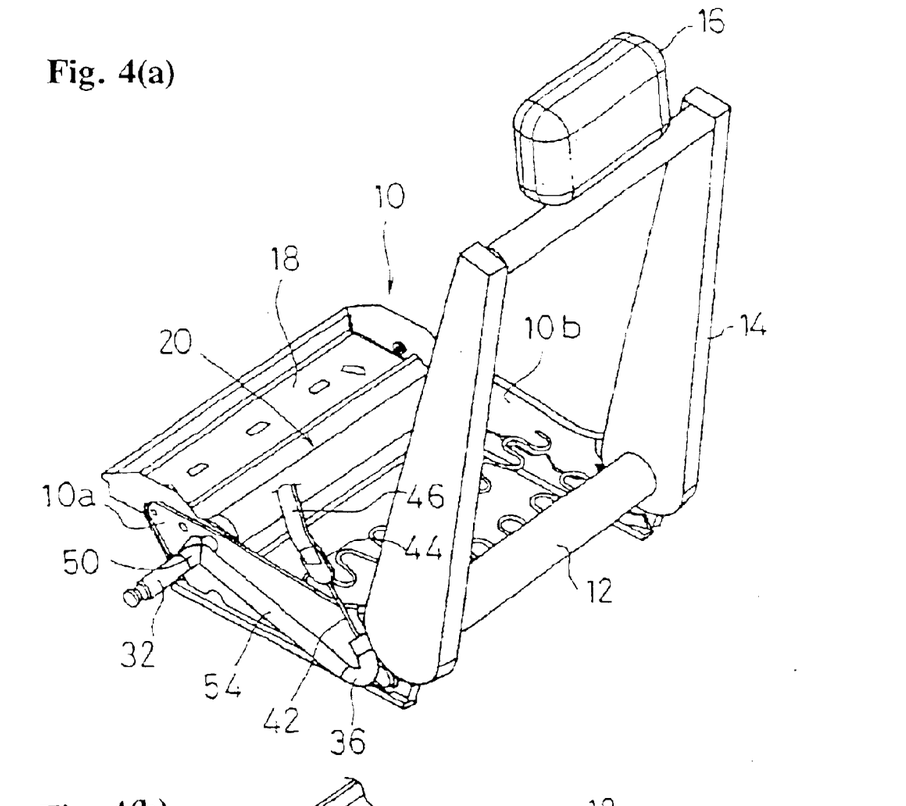
Figure 4B:
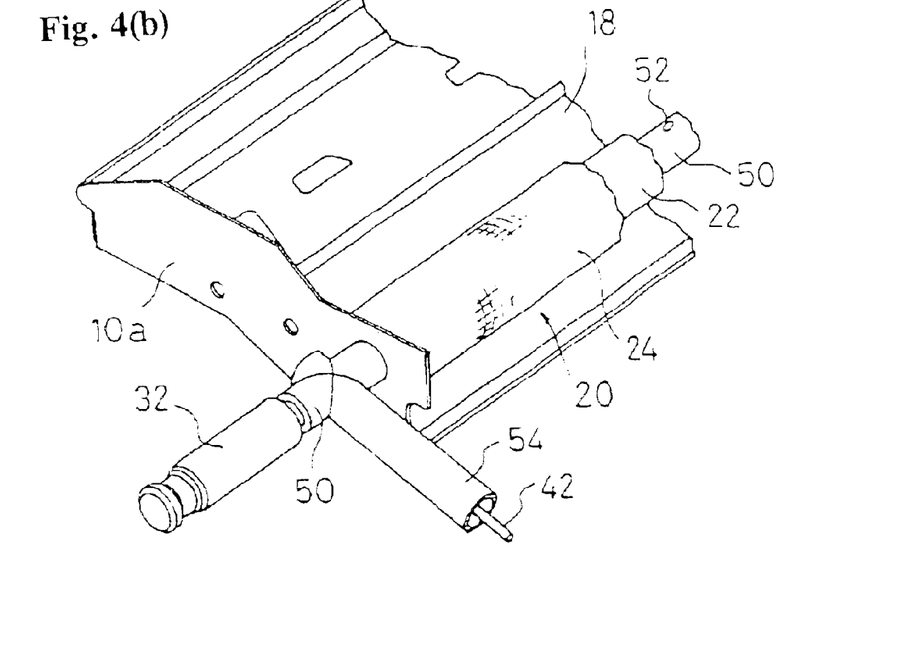
Figures 5A, 5B:
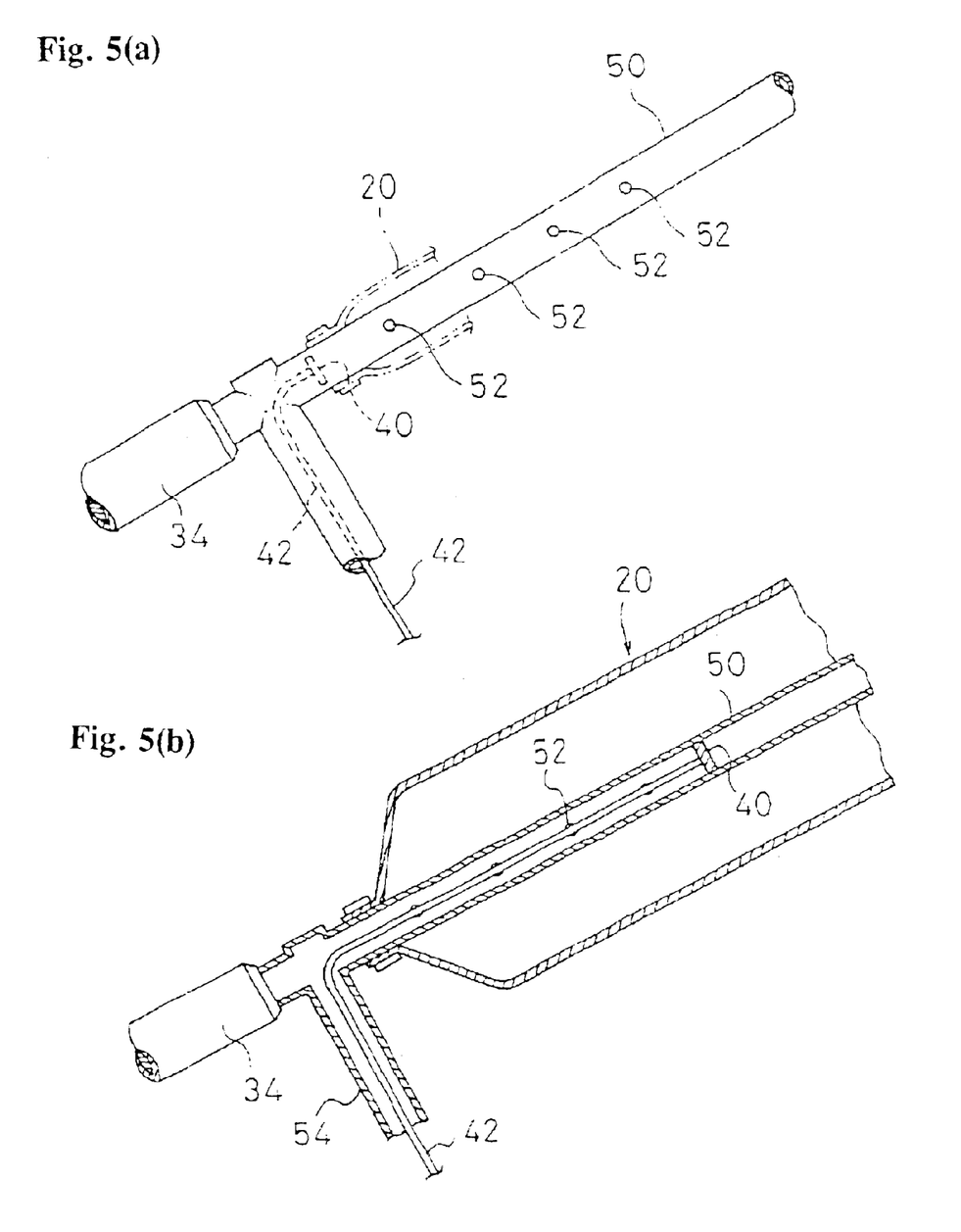

FIG. 4(*a*) illustrates the structure of a seat frame assembly including an occupant protecting device of a second embodiment of the present invention. FIG. 4(*b*) is an enlarged view of a portion thereof. FIGS. 5(*a*) and 5(*b*) each illustrate the structure of a cylinder.

In the second embodiment, a conduit is provided that includes a cylinder 50 and a pipe 54. The cylinder 50 is inserted and disposed in a tube 20. A piston 40 is disposed inside the cylinder 50. The cylinder 50 is disposed between side frame portions 10*a* and 10*b*. One end of the cylinder 50 protrudes sideways from the side frame portion 10*a*, with an inflator 34 being connected to the end of the protruding portion of the cylinder 50. A plurality of gas outlets 52 are disposed apart from each other in the cylinder 50 in the longitudinal direction of the cylinder 50. Each gas outlet 52 is disposed near the side frame portion 10*a*.

The gas outlets 52 may be formed with the same diameters, or with increasing diameters with increasing distance from the inflator 34. In addition, the gas outlets 52 may be separated at equal intervals or at decreasing intervals with increasing distance from the inflator 34.

The pipe 54 is disposed along the outer side of the side frame portion 10*a*. The front end of the pipe 54 is connected to the cylinder 50. The inside of the pipe 54 is connected to the inside of the cylinder 50. A wire 42 whose front end is connected to a piston 40 passes through the pipe 54 from the cylinder 50.

As shown in FIG. 4(*a*), the wire 42 is led upward through a curved tube 36 disposed beside the back end of the pipe 54. The back end (top end) is connected to a lap anchor 44.

The other structural features shown in FIGS. 4(a) to 5(b) are the same as those shown in FIGS. 1(a) to 3(b), so that corresponding parts are given the same reference numerals.

Next, the operation of the device shown in FIGS. 4(a) to 5(b) will be described. Prior to the operation of the inflator 34, as shown in FIG. 5(a), the piston 40 is disposed near the inflator 34. However, the piston 40 is disposed further away from the inflator 34 than the connection portion of the cylinder 50 and the pipe 54.

When an automobile collides from its front side, the inflator 34 operates and generates gas pressure, which, as shown in FIG. 5(b), moves the piston 40 and pulls the wire 42. This causes the lap anchor 44 to be pulled down. As a result, a pre-tension is exerted upon a seatbelt 46. As shown in FIG. 5(b), when the piston 40 moving forward passes openings 52, the openings 52 connect to the inflator 34, so that gas is ejected from the openings 52, causing the tube 20 to be inflated. As a result, the front portion of a cushion pad of a seat cushion is pushed upward or hardened, thereby preventing forward movement of the waist of the occupant. In this embodiment also, a pretension is exerted upon the seatbelt 46 prior to the expansion of the tube 20.

Figure 6A:
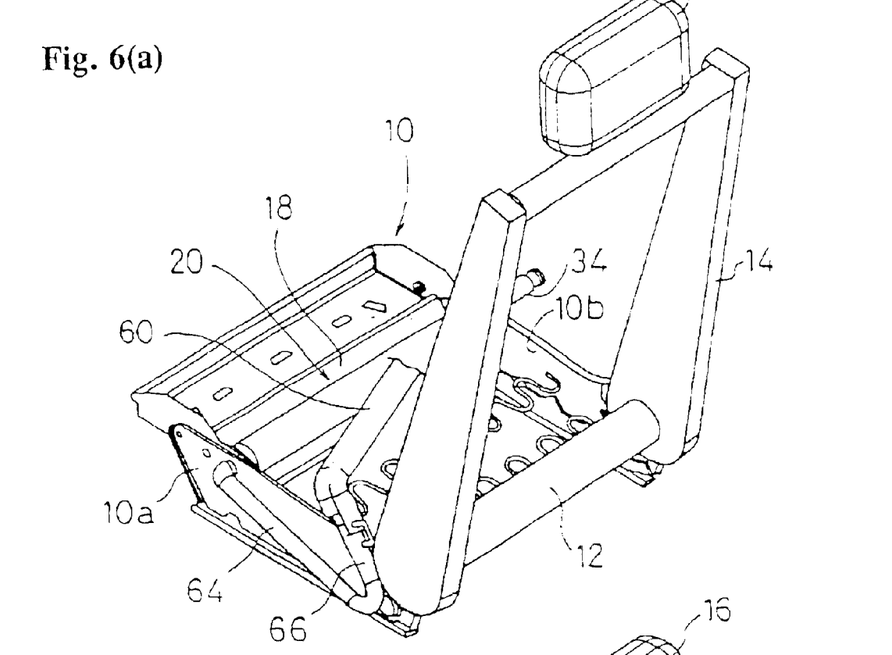
Figure 6B:
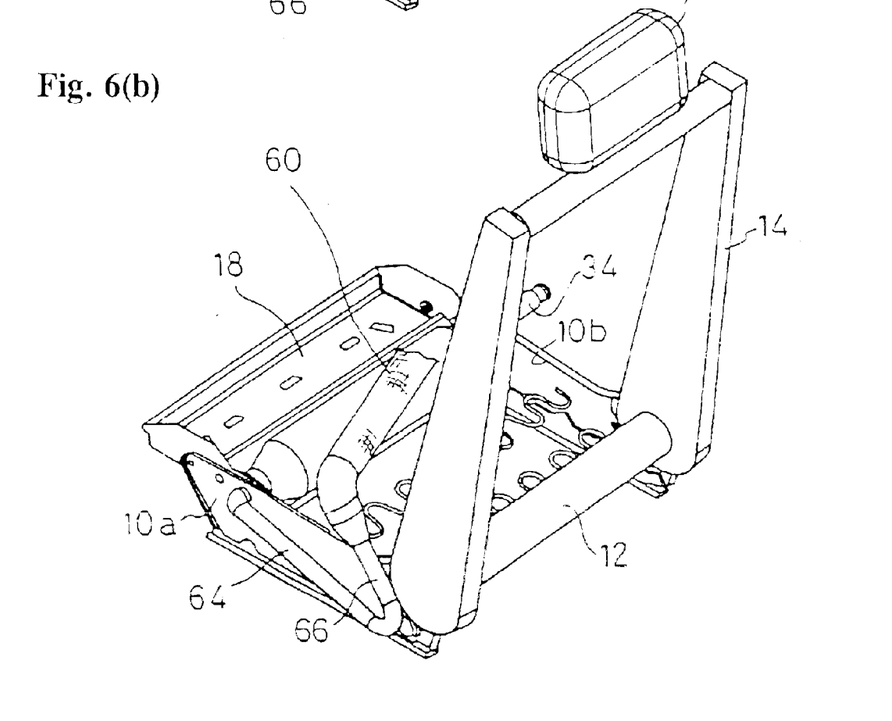
Figure 7A:
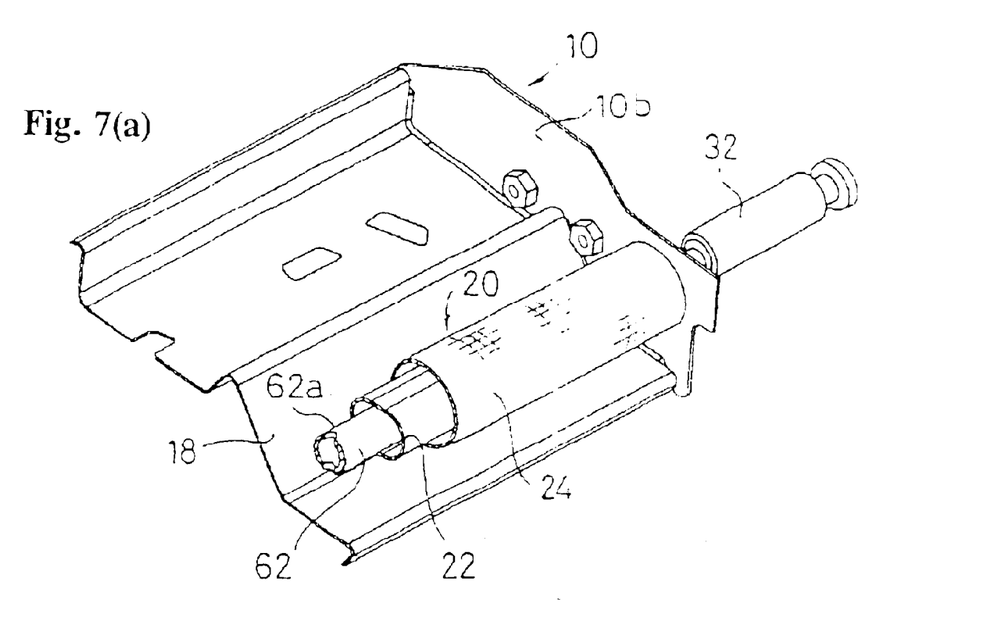
Figure 7B:
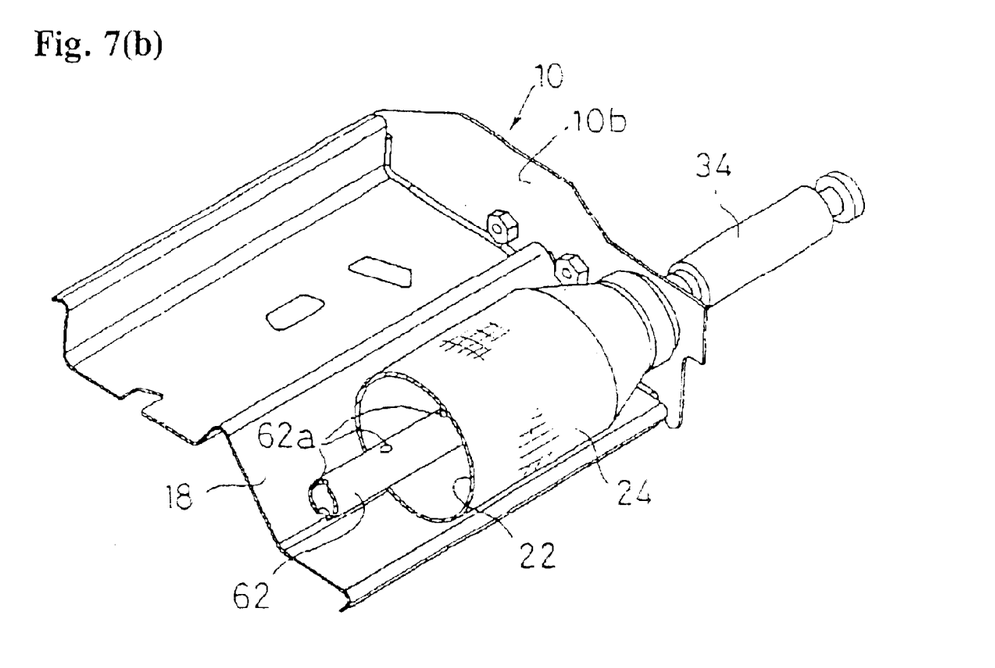

FIGS. 6(a) and 6(b) each illustrate the structure of a seat frame assembly including an occupant crash protector of a third embodiment of the present invention. FIGS. 7(a) and 7(b) are each enlarged views of a portion of the occupant crash protector shown in FIGS. 6(a) and 6(b). FIGS. 6(a) and 7(a) each show a state prior to operation of an inflator, while FIGS. 6(b) and 7(b) each show a state after the operation of the inflator.

In the embodiment, a tube 20 and a bag 60 of an inflatable seatbelt device are both inflated by an inflator 34. The device includes a conduit comprising at least three sections of pipe 62, 64, 66.

The pipe 62 is inserted and disposed inside the tube 20. A plurality of openings 62a are formed at equal intervals in the longitudinal direction in the pipe 62. The pipe 62 is supported by side frame portions 10a and 10b. The inflator 34 is connected to one end (e.g., the end adjacent the side frame 10b portion) of the pipe 62. The other end of the pipe 62 is connected to the front end of the second pipe section 64 disposed along the outer side of the side frame portion 10a. An upwardly rising third pipe section 66 is connected to the back end of the pipe 64, and one end of the bag 60 is connected to the top end of the third pipe section. The bag 60 is obliquely provided along the chest of an occupant like a shoulder belt of a seatbelt device.

The other structural features shown in FIGS. 6(a) to 7(b) are the same as those shown in FIGS. 1(a) to 3(b), so that corresponding parts are given the same reference numerals.

The operation of the occupant protecting device shown in FIGS. 6(a) to 7(b) is as follows. When a vehicle collides from its front side, the inflator 34 causes gas to enter the pipe 62. A portion of the gas flows out from the openings 62a, causing the tube 20 to be inflated. The other portion of the gas passes through the pipes 64 and 66 from the pipe 62 and enters the bag 60, causing the inflatable seat belt device to activate as the bag 60 is inflated.

By the expansion of the tube 20 in this way, the front portion of a cushion pad is pushed upward or hardened, thereby preventing forward movement of the waist of the occupant. By the expansion of the bag 60, the bag 60 comes into close contact with the front surface of the body of the occupant, so that the body is restrained.

According to the third exemplary embodiment of the present invention, the tube 20 and the bag 60 can be inflated by the common inflator 34. In addition, according to the third embodiment, shock produced by collision of a side portion of an automobile can be absorbed by the inflatable seatbelt device.

The present invention is not limited to the above-described embodiments.

Other embodiments are possible. For example, although in the embodiments shown in FIGS. 1(a) to 5(b), the lap anchor is pulled down, a buckle may be pulled down. Although in the embodiment shown in FIGS. 6(a) to 7(b), the bag corresponding to a shoulder belt is inflated, a portion corresponding to a lap belt may also be used as a bag. Here, by inflating, like a lap belt of a seatbelt device, a bag 60, provided along the waist of the occupant, the bag 60 comes into close contact with the waist of the occupant, so that the waist of occupant is pushed down. Therefore, by sandwiching the occupant by the bag 60 at the waist of the occupant and the pushed up or hardened front portion of the cushion pad, the occupant can be firmly restrained at his seat from his thighs to his waist. The inflatable tube may be disposed inside the cushion pad.

As described above, according to the present invention, by the gas generator for inflating the bag disposed at the front portion of the seat cushion, a pre-tension is exerted upon the seatbelt, or the bag of the inflatable seatbelt device is inflated, so that, by using a common part, structural costs can be reduced. According to the present invention, a pre-tension can be exerted upon the seatbelt early.

The priority application, Japanese Patent Application, Number 2002-171687, filed Jun. 12, 2002 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant protecting device comprising:
    an inflatable bag disposed inside or under a front portion of a vehicle seat cushion;
    a gas generator for inflating the bag in case of a vehicle emergency; and
    a pretensioner for applying tension to a seatbelt in conjunction with the operation of the gas generator,
    wherein the pretensioner comprises a cylinder mechanism including a piston configured to be moved by gas pressure generated by the gas generator.

2. The device of claim 1, wherein the pretensioner includes a wire connected to a seat belt anchor.

3. The device of claim 1, further comprising a cylinder passing through the inflatable bag.

4. The device of claim 3, wherein the piston is disposed inside of the cylinder.

5. The device of claim 4, wherein the cylinder is fluidly connected to the gas generator and includes openings for allowing generated gas to pass from the gas generator into the bag.

6. An occupant protecting device comprising:
    an inflatable tube disposed inside or below a front portion of a vehicle seat cushion;
    a gas generator for inflating the inflatable tube in an emergency in a vehicle;
    an inflatable seatbelt device including a bag being inflated along the front side of the body of the occupant when the vehicle is in a collision; and
    a gas guide for inflating the bag of the seatbelt device with gas introduced into the bag from the gas generator.

7. The device of claim 6, wherein gas guide comprises a conduit for carrying gas from the gas generator to the inflatable seatbelt device.

8. The device of claim 7, wherein the conduit passes through the tube.

9. The device of claim 8, wherein the conduit includes holes allowing generated gas to pass from the conduit to the tube.

10. An occupant protection system comprising:
- an inflatable bag disposed under a seating surface of a vehicle seat configured to be inflated so that a front portion the vehicle seat is pushed up;
- a gas generator;
- an occupant restraining mechanism for restraining the forward movement of an occupant's torso when the vehicle is in a frontal collision;
- wherein the gas generator is configured to provide gas for inflating the bag and activating the occupant restraining mechanism.

11. The system of claim 10, wherein the occupant restraining mechanism comprises a seat belt pretensioner.

12. The system of claim 11, further comprising a piston disposed in a cylinder, wherein the piston moves due to pressurized gas generated by the gas generator.

13. The system of claim 12, wherein the piston is operably connected to a seatbelt so that when the piston moves due to operation of the gas generator a tension is exerted on the seatbelt.

14. The system of claim 10, wherein the occupant restraining mechanism comprises an inflatable seat belt.

15. The system of claim 14, wherein the occupant restraining mechanism includes a conduit fluidly connecting the gas generator to the inflatable seat belt.

16. The system of claim 15, wherein the conduit passes through the bag.

17. The system of claim 15, wherein the conduit includes holes for allowing gas to be transferred from gas generator to the bag.

* * * * *